United States Patent
Ohtake et al.

(10) Patent No.: US 9,901,906 B2
(45) Date of Patent: *Feb. 27, 2018

(54) COMPLEX OXIDE, METHOD FOR PRODUCING SAME AND EXHAUST GAS PURIFYING CATALYST

(75) Inventors: Naotaka Ohtake, Anan (JP); Kazuhiko Yokota, Pessac (FR)

(73) Assignee: SOLVAY SPECIAL CHEM JAPAN, LTD., Anan-Shi (JP)

( * ) Notice: Subject to any disclaimer, the term of this patent is extended or adjusted under 35 U.S.C. 154(b) by 1139 days.

This patent is subject to a terminal disclaimer.

(21) Appl. No.: 13/511,804

(22) PCT Filed: Nov. 25, 2010

(86) PCT No.: PCT/JP2010/071006
§ 371 (c)(1),
(2), (4) Date: Aug. 9, 2012

(87) PCT Pub. No.: WO2011/065417
PCT Pub. Date: Jun. 3, 2011

(65) Prior Publication Data
US 2012/0302438 A1    Nov. 29, 2012

(30) Foreign Application Priority Data

Nov. 25, 2009  (JP) ................. 2009-267894

(51) Int. Cl.
*B01J 23/10* (2006.01)
*B01D 53/94* (2006.01)
*B01J 23/00* (2006.01)
*B01J 35/10* (2006.01)
*B01J 37/02* (2006.01)
*B01J 37/03* (2006.01)
(Continued)

(52) U.S. Cl.
CPC .............. *B01J 23/10* (2013.01); *B01D 53/94* (2013.01); *B01J 23/002* (2013.01); *B01J 35/1014* (2013.01); *B01J 37/0201* (2013.01); *B01J 37/031* (2013.01); *C01F 17/0043* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/30* (2013.01); *B01D 2255/9207* (2013.01); *B01J 21/08* (2013.01); *B01J 2523/00* (2013.01); *C01P 2006/13* (2013.01)

(58) Field of Classification Search
CPC ............ B01J 2523/00; B01J 2523/3706; B01J 2523/312; B01J 2523/3718; B01J 2523/41; B01J 2523/3725; B01J 2523/36; B01J 2523/3712; B01J 23/00; B01J 23/002; B01J 23/10; B01J 2255/2061; B01J 2255/2063; B01J 2255/2065; B01J 2255/2066; B01J 2255/2068; B01J 2255/30; B01J 2255/9207; B01J 37/0201; B01J 37/031
See application file for complete search history.

(56) References Cited

U.S. PATENT DOCUMENTS

| | | | |
|---|---|---|---|
| 4,624,940 A | 11/1986 | Wan et al. | |
| 4,780,447 A * | 10/1988 | Kim et al. | .......... 502/243 |
| 4,940,685 A | 7/1990 | Sauvion et al. | |

(Continued)

FOREIGN PATENT DOCUMENTS

| | | |
|---|---|---|
| EP | 0444470 B1 | 4/1994 |
| JP | 62-56322 A | 3/1987 |
| JP | 4-214026 A | 8/1992 |
| JP | 5-270824 A | 10/1993 |
| JP | 2000-72437 A | 3/2000 |
| JP | 2009-537432 A | 10/2009 |
| RU | 2370308 C1 | 10/2009 |
| WO | 2008/046920 A1 | 4/2008 |
| WO | 2008/156219 A1 | 12/2008 |

OTHER PUBLICATIONS

Reddy et al., "Nanosized $CeO_2$—$SiO_2$, $CeO_2$—$TiO_2$, and $CeO_2$-$ZrO_2$ Mixed Oxides: Influence of Supporting Oxide on Thermal Stability and Oxygen Storage Properties of Ceria," Catalysis Surveys from Asia, 2005, vol. 9, No. 3, pp. 155-171.

(Continued)

*Primary Examiner* — Melvin C. Mayes
*Assistant Examiner* — Smita S Patel
(74) *Attorney, Agent, or Firm* — Sughrue Mion, PLLC

(57) ABSTRACT

Disclosed are a composite oxide which is capable of maintaining a large specific surface area even used in a high temperature environment, and which has excellent heat resistance and reducibility, as well as a method for producing the composite oxide and a catalyst for exhaust gas purification employing the composite oxide. The composite oxide contains cerium and at least one of rare earth metal elements other than cerium and including yttrium, at a mass ratio of 85:15 to 99:1 in terms oxides, and further containing silicon at more than 0 parts by mass and not more than 20 parts by mass in terms of $SiO_2$ with respect to 100 parts by mass of the total of the cerium and the at least one of rare earth metal elements other than cerium and including yttrium, wherein the composite oxide has a specific surface area of not less than 40 $m^2/g$ as measured by the BET method after calcination at 900° C. for 5 hours, and a reducibility of not lower than 30% as calculated from measurement of temperature-programmed reduction from 50° C. to 900° C. after calcination at 1000° C. for 5 hours, and is particularly suitable for a co-catalyst for a catalyst for exhaust gas purification.

9 Claims, No Drawings

(51) Int. Cl.
*C01F 17/00* (2006.01)
*B01J 21/08* (2006.01)

(56) References Cited

U.S. PATENT DOCUMENTS

| | | | | |
|---|---|---|---|---|
| 5,529,969 | A * | 6/1996 | Bonneau | B01J 23/10 |
| | | | | 502/235 |
| 5,532,198 | A * | 7/1996 | Chopin | C01G 25/00 |
| | | | | 502/303 |
| 7,238,639 | B2 * | 7/2007 | Mussmann | B01D 53/945 |
| | | | | 502/304 |
| 2004/0209770 | A1 * | 10/2004 | Nakatsuji | B01D 53/945 |
| | | | | 502/302 |
| 2007/0189955 | A1 * | 8/2007 | Larcher | C01G 25/00 |
| | | | | 423/503 |
| 2009/0099014 | A1 | 4/2009 | Miura | |
| 2010/0040523 | A1 | 2/2010 | Larcher et al. | |
| 2010/0247407 | A1 | 9/2010 | Larcher et al. | |

OTHER PUBLICATIONS

European Patent Office, European Search Report issued in corresponding EP Application No. 10833263.6, dated Aug. 8, 2013.
International Search Report for PCT/JP2010/071006 dated Feb. 8, 2011.
Heiko Schultz et al., "Flame-made nanocrystalline ceria/zirconia doped with alumina or silica: structural properties and enhance oxygen exchange capacity", Journal of Materials Chemistry, 2003, pp. 2979-2984, vol. 13.
Russian Patent Office, Communication dated Aug. 24, 2015 issued in corresponding Russian application No. 2012126072.

* cited by examiner

US 9,901,906 B2

COMPLEX OXIDE, METHOD FOR PRODUCING SAME AND EXHAUST GAS PURIFYING CATALYST

CROSS REFERENCE TO RELATED APPLICATIONS

This application is a National Stage of International Application No. PCT/JP2010/071006 filed Nov. 25, 2010, claiming priority based on Japanese Patent Application No. 2009-267894 filed Nov. 25, 2009, the contents of all of which are incorporated herein by reference in their entirety.

FIELD OF ART

The present invention relates to a composite oxide which may be used as a catalyst, functional ceramics, solid electrolyte for fuel cells, abrasive, and the like, particularly suitably used as a co-catalyst material in catalysts for purifying vehicle exhaust gas and the like, and which has excellent heat resistance and cerium oxide reducibility, as well as to a method for producing the composite oxide and a catalyst for exhaust gas purification employing the composite oxide.

BACKGROUND ART

Catalysts for purifying vehicle exhaust gas and the like are composed of a catalytic metal such as platinum, palladium, or rhodium, and a co-catalyst for enhancing the catalyst action of such metal, both supported on a catalyst support made of, for example, alumina or cordierite. The co-catalyst material absorbs oxygen under the oxidizing atmosphere and desorbs oxygen under the reducing atmosphere, and functions to optimally maintain the fuel/air ratio for efficient purification of noxious components in exhaust gases, such as hydrocarbons, carbon monoxide, and nitrogen oxides.

Efficiency of a catalyst for purifying exhaust gas is generally proportional to the contact area between the active species of the catalytic metal and exhaust gas. It is also important to maintain the fuel/air ratio at optimum, for which the reducibility associated with oxygen absorbing and desorbing capability of the co-catalyst should be maintained at a high level. However, the co-catalyst, such as cerium-containing oxides, is apt to be sintered during use at high temperatures, e.g., for exhaust gas purification. This results in reduction of its specific surface area, causing aggregation of the catalytic metals and decrease in the contact area between exhaust gas and the catalytic metals, which leads to reduction of efficiency in purifying exhaust gases.

In the light of the above, for improving the heat resistance of cerium oxide, Patent Publication 1 discloses methods of producing a ceric composite oxide containing silicon, rare earth metal elements, or the like, wherein ceric oxide is intimately mixed with an oxide of a metallic element such as silicon or rare earth metal elements, and calcined; wherein ceric oxide is impregnated with an aqueous solution of a metal salt, such as silicate or salts of rare earth metal elements, which may be converted to an oxide by heating, and calcined; or wherein an oxide precursor of a metal element, such as silicon or rare earth metal elements, is introduced into an aqueous colloidal dispersion of a cerium (IV) compound, a basic material is added to the dispersion to obtain a precipitate, the precipitate thus formed is subjected to solid-liquid separation and heat-treated. This publication also discloses that the amount of the oxide of a metallic element such as silicon or rare earth metal elements is 1 to 20 mass %, preferably 1 to 5 mass % of the ceric oxide.

However, in the specific examples disclosed in Patent Publication 1, no composite oxide is disclosed which contains all of cerium, silicon, and at least one of rare earth elements. Further, the ceric oxides containing 2.5 mass % $SiO_2$ specifically produced in Examples 1, 5, and 6 of Patent Publication 1 exhibit specific surface areas of 20 $m^2/g$ at most as measured by the BET method after calcination at 900° C. for 6 hours. Further improvement is demanded.

For improvement of the heat resistance and the like of cerium oxide, there has been proposed to add rare earth metal elements or silicon as a stabilizer (Patent Publications 2 to 5). These publications propose some composite oxides having excellent heat resistance at higher temperatures and capability of maintaining a specific surface area measured by the BET method.

However, no composite oxide is known which contains all of cerium, silicon, and at least one of rare earth metal elements other than cerium, and has excellent heat resistance, capability of maintaining a large specific surface area, and sufficient reducibility.

PRIOR ART PUBLICATIONS

Patent Publications

Patent Publication 1: JP-62-56322-A
Patent Publication 2: WO-2008-156219-A
Patent Publication 3: JP-4-214026-A
Patent Publication 4: JP-2000-72437-A
Patent Publication 5: JP-5-270824-A

SUMMARY OF THE INVENTION

It is an object of the present invention to provide a composite oxide which is capable of maintaining a large specific surface area even in use in a high temperature environment, which has excellent heat resistance and excellent reducibility, and which is particularly suitable for a co-catalyst for a catalyst for exhaust gas purification, as well as a catalyst for exhaust gas purification utilizing the composite oxide.

It is another object of the present invention to provide a method for producing a composite oxide which realizes easy production of the composite oxide of the present invention with excellent heat resistance and reducibility.

According to the present invention, there is provided a composite oxide comprising cerium and at least one of rare earth metal elements other than cerium and including yttrium, at a mass ratio of 85:15 to 99:1 in terms oxides, and further comprising silicon at more than 0 parts by mass and not more than 20 parts by mass in terms of $SiO_2$ with respect to 100 parts by mass of a total of said cerium and said at least one of rare earth metal elements other than cerium and including yttrium, wherein said composite oxide has properties of exhibiting a specific surface area of not less than 40 $m^2/g$ as measured by BET method after calcination at 900° C. for 5 hours, and a reducibility of not lower than 30% as calculated from measurement of temperature-programmed reduction from 50° C. to 900° C. after calcination at 1000° C. for 5 hours (sometimes referred to as a present composite oxide hereinbelow).

According to the present invention, there is also provided a method for producing a composite oxide comprising the steps of:

(a) providing a cerium solution not less than 90 mol % of which cerium ions are tetravalent, (b) heating and maintaining said cerium solution obtained from step (a) up to and at not lower than 60° C., (c) adding an oxide precursor of at least one of rare earth metal elements other than cerium and including yttrium to a cerium suspension obtained through said heating and maintaining, (d) heating and maintaining said cerium suspension containing said oxide precursor of said at least one of rare earth metal elements other than cerium and including yttrium up to and at not lower than 100° C., (e) adding a precipitant to the suspension obtained from step (d) to obtain a precipitate, (f) calcining said precipitate, (g) impregnating an oxide obtained through said calcining, with a solution of a silicon oxide precursor, and (h) calcining said oxide impregnated with the solution of a silicon oxide precursor (sometimes referred to as the first method hereinbelow).

According to the present invention, there is further provided a method for producing a composite oxide comprising the steps of:

(A) providing a cerium solution not less than 90 mol % of which cerium ions are tetravalent, (B) heating and maintaining said cerium solution obtained from step (A) up to and at not lower than 60° C., (C) adding a silicon oxide precursor and an oxide precursor of at least one of rare earth metal elements other than cerium and including yttrium, to a cerium suspension obtained through said heating and maintaining, (D) heating and maintaining said cerium suspension containing said silicon oxide precursor and said oxide precursor of at least one of rare earth metal elements other than cerium and including yttrium up to and at not less than 100° C., (E) adding a precipitant to the suspension obtained from step (D) to obtain a precipitate, and (F) calcining said precipitate thus obtained (sometimes referred to as the second method hereinbelow).

According to the present invention, there is also provided a catalyst for exhaust gas purification comprising the composite oxide of the present invention.

The composite oxide according to the present invention contains silicon and at least one of rare earth metal elements other than cerium and including yttrium (sometimes referred to as particular rare earth metal elements hereinbelow) at a particular ratio, is capable of maintaining excellent heat resistance, and has excellent reducibility, so that it is useful as a co-catalyst for a catalyst for exhaust gas purification.

The methods for producing a composite oxide according to the present invention include the steps (a) to (h) or steps (A) to (F), so that the composite oxide of the present invention may readily be obtained.

PREFERRED EMBODIMENTS OF THE INVENTION

The present invention will now be explained in detail.

The composite oxide according to the present invention has properties of exhibiting a specific surface area of not less than 40 m$^2$/g, preferably not less than 50 m$^2$/g, more preferably not less than 60 m$^2$/g, most preferably not less than 80 m$^2$/g as measured by the BET method after calcination at 900° C. for 5 hours, and a reducibility of not lower than 30%, preferably not lower than 40%, more preferably not lower than 60%, as calculated from measurement of temperature-programmed reduction from 50° C. to 900° C. after calcination at 1000° C. for 5 hours. The maximum specific surface area is not particularly limited and may be about 120 m$^2$/g, and the maximum reducibility is not particularly limited and may be about 90%.

The present composite oxide also has a property of exhibiting a specific surface area of not less than 25 m$^2$/g, preferably not less than 40 m$^2$/g, more preferably not less than 50 m$^2$/g, most preferably not less than 60 m$^2$/g as measured by the BET method after calcination at 1000° C. for 5 hours. With a specific surface area of less than 40 m$^2$/g as measured by the BET method after calcination at 900° C. for 5 hours and a reducibility of less than 30% as calculated from measurement of temperature-programmed reduction from 50 to 900° C. after calcination at 1000° C. for 5 hours, the composite oxide cannot achieve both sufficient heat resistance and excellent reducibility at the same time, and may not exhibit excellent catalytic function when contained in a catalyst for exhaust gas purification.

As used herein, the specific surface area is a value determined by the BET method using nitrogen gas adsorption, which is a most popular method for determining specific surface areas of powders. The reducibility is a percent of trivalent cerium in the oxide reduced from tetravalent cerium as calculated from measurement of temperature-programmed reduction (TPR) from 50° C. to 900° C.

TPR is measured with an automatic temperature-programmed reduction analyzer (model TP-5000, manufactured by KABUSHIKI KAISHA OKURA RIKEN), under the following conditions; carrier gas: 90% argon-10% hydrogen; gas flow rate: 30 mL/min.; rate of raising temperature of sample during measurement: 10° C./min.; sample weight: 0.5 g.

The calculation was made according to the following formula:

Reducibility (%)=Hydrogen consumption of the sample actually measured (μmol/g)/Theoretical hydrogen consumption of cerium oxide in the sample (μmol/g)×100

The composite oxide according to the present invention has the above-mentioned properties, and contains cerium and at least one of the particular rare earth metal elements at a mass ratio of 85:15 to 99:1, preferably 85:15 to 95:5, in terms of oxides, and further contains silicon at more than 0 parts by mass and not more than 20 parts by mass, preferably 1 to 20 parts by mass, more preferably 2 to 20 parts by mass, most preferably 5 to 20 parts by mass in terms of SiO$_2$ with respect to 100 parts by mass of a total of the cerium and the at least one of the particular rare earth metal elements. If the cerium content in terms of CeO$_2$ in the oxide of cerium and the at least one of the particular rare earth metal elements is less than 85 mass % or more than 99 mass %, the heat resistance and the reducibility may be low. On the other hand, without silicon, sufficient heat resistance and reducibility cannot be achieved, whereas at a silicon content of more than 20 parts by mass in terms of SiO$_2$, the specific surface area may be small.

The at least one of particular rare earth metal elements may be, for example, yttrium, lanthanum, praseodymium, neodymium, samarium, europium, gadolinium, terbium, dysprosium, holmium, erbium, thulium, ytterbium, lutetium, or a mixture of two or more of these, with yttrium, lanthanum, praseodymium, neodymium, or a mixture of two or more of these being particularly preferred.

In the present invention, yttrium is expressed in terms of $Y_2O_3$, lanthanum in terms of $La_2O_3$, cerium in terms of $CeO_2$, praseodymium in terms of $Pr_6O_{11}$, neodymium in terms of $Nd_2O_3$, samarium in terms of $Sm_2O_3$, europium in terms of $Eu_2O_3$, gadolinium in terms of $Gd_2O_3$, terbium in terms of $Tb_4O_7$, dysprosium in terms of $Dy_2O_3$, holmium in terms of $Ho_2O_3$, erbium in terms of $Er_2O_3$, thulium in terms of $Tm_2O_3$, ytterbium in terms of $Yb_2O_3$, and lutetium in terms of $Lu_2O_3$.

The production methods according to the present invention realize easy production of composite oxides, such as the present composite oxide, with good reproducibility, and the first of the methods includes step (a) of providing a cerium solution not less than 90 mol % of which cerium ions are tetravalent.

A water-soluble cerium compound which may be used in step (a) may be, for example, a ceric nitrate solution or ammonium ceric nitrate, with the ceric nitrate solution being particularly preferred.

In step (a), the initial concentration of the cerium solution not less than 90 mol % of which cerium ions are tetravalent, may be adjusted to usually 5 to 100 g/L cerium, preferably 5 to 80 g/L, more preferably 10 to 70 g/L in terms of $CeO_2$. Usually water is used for the adjustment of the concentration of the cerium solution, and deionized water is particularly preferred. If the initial concentration is too high, the crystallinity of the precipitate to be discussed later is not sufficiently high and sufficient pores cannot be formed for holding the silicon oxide precursor and the oxide precursor of at least one of the particular rare earth metal elements to be discussed later, resulting in insufficient heat resistance and reducibility of the ultimate composite oxide. Too low an initial concentration leads to low productivity, which is not industrially advantageous.

In the first method, step (b) of heating and maintaining the cerium solution obtained from step (a) up to and at not lower than 60° C. is carried out to cause reaction of the cerium solution. A reactor to be used in step (b) may either be a sealed- or open-type vessel. An autoclave reactor may preferably be used.

In step (b), the temperature at which the cerium solution is heated and maintained is not lower than 60° C., preferably 60 to 200° C., more preferably 80 to 180° C., most preferably 90 to 160° C. The duration of heating and maintaining is usually 10 minutes to 48 hours, preferably 30 minutes to 36 hours, more preferably 1 hour to 24 hours. With insufficient heating and maintaining, the crystallinity of the precipitate to be discussed later is not sufficiently high and a sufficient volume of pores cannot be formed for impregnation with the solution of silicon oxide precursor and the oxide precursor of at least one of the particular rare earth metal elements to be discussed later, resulting in insufficient heat resistance and reducibility of the ultimate composite oxide. Too long a period of heating and maintaining affects little the heat resistance and the reducibility and is not industrially advantageous.

The first method further includes step (c) of adding an oxide precursor of at least one of the particular rare earth metal elements, i.e., an oxide precursor of at least one of rare earth metal elements other than cerium and including yttrium, to a cerium suspension obtained through the heating and maintaining in step (b).

The oxide precursor of at least one of the particular rare earth metal elements may be any compound which may be converted to an oxide of at least one of the particular rare earth metal elements through an oxidation treatment, such as calcining, and may be, for example, a nitric acid solution of at least one of the particular rare earth metal elements.

The amount of the oxide precursor of at least one of the particular rare earth metal elements, expressed in a mass ratio of cerium in the cerium suspension to the at least one of the particular rare earth metal elements in the oxide precursor of at least one of the particular rare earth metal elements in terms of oxides, may be adjusted to usually 85:15 to 99:1, preferably 85:15 to 95:5. At a cerium content in terms of $CeO_2$ in the oxide of cerium and the at least one of the particular rare earth metal elements of less than 85 mass % or more than 99 mass %, the heat resistance and the reducibility may be low.

Step (c) may be carried out after the cerium suspension obtained through the heating and maintaining in step (b) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably a room temperature of 20 to 30° C.

In step (c), before adding the oxide precursor of the at least one of the particular rare earth metal elements, the salt concentration of the cerium suspension may be adjusted by removing the mother liquor from the cerium suspension or by adding water. The removal of the mother liquor may be effected, for example, by decantation, Nutsche method, centrifugation, or filter-pressing. In this case, a slight amount of cerium is removed with the mother liquor, so the amounts of the oxide precursor of the at least one of the particular rare earth metal elements and water to be added next may be adjusted, taking this removed amount of cerium into consideration.

The first method includes step (d) of heating and maintaining the cerium suspension containing the oxide precursor of the at least one of the particular rare earth metal elements up to and at not lower than 100° C., preferably 100 to 200° C., more preferably 100 to 150° C.

In step (d), the duration of heating and maintaining is usually 10 minutes to 6 hours, preferably 20 minutes to 5 hours, more preferably 30 minutes to 4 hours.

In step (d) of heating and maintaining, at lower than 100° C. the crystallinity of the precipitate to be discussed later is not sufficiently high, resulting in insufficient heat resistance and reducibility of the ultimate composite oxide. Too long a period of heating and maintaining affects little the heat resistance and the reducibility and is not industrially advantageous.

The first method includes step (e) of adding a precipitant to the suspension obtained from step (d) to obtain a precipitate.

The precipitant used in step (e) may be a base, for example, sodium hydroxide, potassium hydroxide, aqueous ammonia, ammonia gas, or a mixture thereof, with aqueous ammonia being particularly preferred.

The precipitant may be added, for example, by preparing an aqueous solution of the precipitant at a suitable concentration and adding the solution to the suspension obtained from step (d) under stirring, or in the case of ammonia gas, by bubbling the suspension with the ammonia gas in the reactor under stirring. The amount of the precipitant to be added may easily be determined by monitoring the pH change of the suspension. Usually, the amount for generating a precipitate in the suspension at about pH 7 to 9, preferably pH 7 to 8.5, is sufficient.

Step (e) may be carried out after the cerium suspension obtained through the heating and maintaining in step (d) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably about a room temperature of 20 to 30° C.

Through the precipitation reaction in step (e), a slurry containing a precipitate of cerium oxide hydrate with grown crystals is obtained. The precipitate may be separated by, for example, the Nutsche method, centrifugation, or filter-pressing. The precipitate may optionally be washed with water as needed. Further, in order to improve the efficiency in the following step (f), the precipitate may optionally be dried to a suitable level.

The first method includes step (f) of calcining the precipitate. The temperature for the calcining is usually 250 to 500° C., preferably 280 to 450° C. The duration of the calcining is usually 30 minutes to 36 hours, preferably 1 hour to 24 hours, more preferably 3 to 20 hours.

The oxide obtained through calcination in step (f) is in the form of a porous body having pores of a sufficient volume for impregnation with a solution of a silicon oxide precursor to be discussed later. This facilitates impregnation with a solution of a silicon oxide precursor and improves the heat resistance and the reducibility of the ultimate composite oxide.

The first method includes step (g) of impregnating the oxide obtained through calcination with a solution of a silicon oxide precursor.

The silicon oxide precursor used in step (g) may be any compound which may be converted to a silicon oxide through an oxidation treatment, such as calcining, as long as the calcined oxide porous body may be impregnated with the compound dissolved in a solvent. Examples of the precursor may include silicates, such as sodium silicate, silane compounds, such as tetraethyl orthosilicate, silyl compounds, such as trimethylsilyl isocyanate, and quaternary ammonium silicates, such as tetramethyl ammonium silicate.

The solvent to be used for dissolving the silicon oxide precursor may be selected depending on the kind of the precursor to be used, and may be, for example, water or organic solvents, such as alcohol, xylene, hexane, or toluene.

The concentration of the solution of the silicon oxide precursor is not particularly limited as long as the oxide porous body may be impregnated with the solution, and may usually be 1 to 300 g/L, preferably about 10 to 200 g/L of the silicon oxide precursor in terms of $SiO_2$ for workability and efficiency.

In step (g), the amount of the silicon oxide precursor is usually more than 0 parts by mass and not more than 20 parts by mass, preferably 1 to 20 parts by mass, more preferably 2 to 20 parts by mass, most preferably 5 to 20 parts by mass of the silicon oxide precursor in terms of $SiO_2$ with respect to 100 parts by mass of the total of the cerium and the at least one of the particular rare earth metal elements in the oxide in terms of oxides. With too small an amount of silicon, the heat resistance and the reducibility of the resulting composite oxide is low, whereas with too large an amount of silicon, the heat resistance of the resulting composite oxide is also low and the specific surface area at higher temperatures tends to decrease.

In step (g), the impregnation of the oxide with the solution of the silicon oxide precursor may be carried out, for example, by pore-filling, adsorption, or evaporation to dryness.

The pore-filling may be effected by measuring in advance the total pore volume of the oxide, and adding the same volume of the solution of the silicon oxide precursor so that the surface of the oxide is evenly wetted.

The first method includes step (h) of calcining the oxide impregnated with the solution of the silicon oxide precursor. The temperature of the calcination is usually 300 to 700° C., preferably 350 to 600° C.

The duration of calcination in step (h) may suitably be determined in view of the calcination temperature, and may usually be 1 to 10 hours.

In the first method, after step (g) and before step (h), the oxide impregnated with the silicon oxide precursor may optionally be dried at about 60 to 200° C. With such a drying step, the efficiency of the calcination in step (h) may be improved.

The second method according to the present invention includes step (A) of providing a cerium solution not less than 90 mol % of which cerium ions are tetravalent.

A water-soluble cerium compound which may be used in step (A) may be, for example, a ceric nitrate solution or ammonium ceric nitrate, with the ceric nitrate solution being particularly preferred.

In step (A), the initial concentration of the cerium solution not less than 90 mol % of which cerium ions are tetravalent, may be adjusted to usually 5 to 100 g/L cerium, preferably 5 to 80 g/L, more preferably 10 to 70 g/L in terms of $CeO_2$. Usually water is used for the adjustment of the concentration of the cerium solution, and deionized water is particularly preferred. If the initial concentration is too high, the crystallinity of the precipitate to be discussed later is not sufficiently high and a sufficient volume of pores cannot be formed, resulting in insufficient heat resistance and reducibility of the ultimate composite oxide. Too low an initial concentration leads to low productivity, which is not industrially advantageous.

In the second method, step (B) of heating and maintaining the cerium solution obtained from step (A) up to and at not lower than 60° C. is carried out next.

A reactor to be used in step (B) may either be a sealed- or open-type vessel, and an autoclave reactor may preferably be used.

In step (B), the temperature at which the cerium solution is heated and maintained is not lower than 60° C., preferably 60 to 200° C., more preferably 80 to 180° C., most preferably 90 to 160° C. The duration of heating and maintaining is usually 10 minutes to 48 hours, preferably 30 minutes to 36 hours, more preferably 1 hour to 24 hours. With insufficient heating and maintaining, the crystallinity of the precipitate to be discussed later is not sufficiently high and a sufficient volume of pores cannot be formed, resulting in insufficient heat resistance and reducibility of the ultimate composite oxide. Too long a period of heating and maintaining affects little the heat resistance and the reducibility and is not industrially advantageous.

The second method further includes step (C) of adding a silicon oxide precursor and an oxide precursor of at least one of the particular rare earth metal elements to a cerium suspension obtained from step (B)

In step (C), the silicon oxide precursor to be added to the cerium suspension may be any compound which may be converted to silicon oxide through an oxidation treatment, such as calcination, and may be, for example, colloidal silica, siliconate, or quaternary ammonium silicate sol, with the colloidal silica being particularly preferred in view of the production cost and reduction of environmental burden.

In step (C), the amount of the silicon oxide precursor is more than 0 parts by mass and not more than 20 parts by mass of the silicon oxide precursor, preferably 1 to 20 parts by mass, more preferably 2 to 20 parts by mass, most preferably 5 to 20 parts by mass, in terms of $SiO_2$ with respect to 100 parts by mass of the total of the cerium and the at least one of the particular rare earth metal elements in the ultimate composite oxide in terms of oxides. With too small an amount of silicon, the heat resistance and the reducibility of the resulting composite oxide tend to be low, whereas with too large an amount of silicon, the heat resistance of the resulting composite oxide is also low and the specific surface area at higher temperatures tends to decrease.

The oxide precursor of the at least one of the particular rare earth metal elements in step (C) may be any compound which may be converted to an oxide of at least one of the particular rare earth metal elements through an oxidation treatment, such as calcining, and may be, for example, a nitric acid solution containing at least one of the particular rare earth metal elements.

The amount of the oxide precursor of the at least one of the particular rare earth metal elements, expressed in a mass ratio of cerium in the cerium suspension to the at least one of the particular rare earth metal elements in the oxide precursor of the at least one of the particular rare earth metal elements in terms of oxides, may be adjusted to usually 85:15 to 99:1, preferably 85:15 to 95:5. At a cerium content in terms of $CeO_2$ in the oxide of cerium and the at least one of the particular rare earth metal elements is less than 85 mass % or more than 99 mass %, the heat resistance and the reducibility may be low.

Step (C) may be carried out after the cerium suspension obtained through the heating and maintaining in step (B) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably about a room temperature of 20 to 30° C.

In step (C), before adding the silicon oxide precursor and the oxide precursor of the at least one of the particular rare earth metal elements, the salt concentration of the cerium suspension may be adjusted by removing the mother liquor from the cerium suspension or by adding water. The removal of the mother liquor may be effected, for example, by decantation, Nutsche method, centrifugation, or filter-pressing. In this case, a slight amount of cerium is removed with the mother liquor, so the amounts of the silicon oxide precursor, the oxide precursor of the at least one of the particular rare earth metal elements, and water to be added next may be adjusted, taking this removed amount of cerium into consideration.

The second method includes step (D) of heating and maintaining the cerium suspension containing the silicon oxide precursor and the oxide precursor of the at least one of the particular rare earth metal elements up to and at not lower than 100° C., preferably 100 to 200° C., more preferably 100 to 150° C.

In step (D), the duration of the heating and maintaining may be usually 10 minutes to 6 hours, preferably 20 minutes to 5 hours, more preferably 30 minutes to 4 hours.

In step (D) of heating and maintaining, at lower than 100° C., the crystallinity of the precipitate to be discussed later is not sufficiently high, resulting in insufficient heat resistance and reducibility of the ultimate composite oxide. Too long a period of heating and maintaining affects little the heat resistance and the reducibility and is not industrially advantageous.

The second method includes step (E) of adding a precipitant to the suspension obtained from step (D) to obtain a precipitate.

The precipitant used in step (E) may be a base, for example, sodium hydroxide, potassium hydroxide, aqueous ammonia, ammonia gas, or a mixture thereof, with aqueous ammonia being particularly preferred. The amount of the precipitant to be added in step (E) may easily be determined by monitoring the pH change of the suspension. Usually, the amount for generating a precipitate in the suspension at about pH 7 to 9, preferably pH 7 to 8.5, is sufficient.

Step (E) may be carried out after the cerium suspension obtained through the heating and maintaining in step (D) is cooled.

Such cooling may usually be carried out under stirring according to a commonly known method. The cooling may either be natural cooling by leaving the suspension to stand, or forced cooling with cooling tubes. The cooling may be carried out down to usually 40° C. or lower, preferably about a room temperature of 20 to 30° C.

The precipitate may be separated by, for example, the Nutsche method, centrifugation, or filter-pressing. The precipitate may optionally be washed with water as needed.

The second method includes step (F) of calcining the precipitate thus obtained. The temperature for the calcining is usually 300 to 700° C., preferably 350 to 600° C.

The duration of the calcination in step (F) may suitably be determined in view of the calcination temperature, and may usually be 1 to 10 hours.

Through step (F), a composite oxide with excellent heat resistance and reducibility may be obtained.

According to the methods of the present invention, the composite oxide obtained from step (h) or (F) may be ground into a powder before use. The grinding may be carried out with a commonly used pulverizer, such as a hammer mill, to sufficiently obtain a powder of a desired powder size.

The particle size of the composite oxide powder obtained by the present methods may be made as desired through the above-mentioned grinding, and may preferably be a mean particle diameter of 1 to 50 µm for use as a co-catalyst for a catalyst for exhaust gas purification.

The catalyst for exhaust gas purification according to the present invention is not particularly limited as long as the catalyst is provided with a co-catalyst containing the composite oxide of the present invention, and the method of production and other materials to be used may be, for example, conventional.

EXAMPLES

The present invention will now be explained in more detail with reference to Examples and Comparative Examples, which are not intended to limit the present invention.

Example 1

This example relates to a composite oxide containing cerium oxide, lanthanum oxide, and praseodymium oxide at 90:5:5 by mass in total of 100 parts by mass, with respect to which 1 part by mass of silicon oxide was added.

50 g of a ceric nitrate solution in terms of $CeO_2$ containing not less than 90 mol % tetravalent cerium ions was measured out, and adjusted to a total amount of 1 L with pure water. The obtained solution was heated to 100° C., maintained at this temperature for 30 minutes, and allowed to cool down to the room temperature, to thereby obtain a cerium suspension.

After the mother liquor was removed from the cerium suspension thus obtained, 10.4 ml of a lanthanum nitrate solution (2.6 g in terms of $La_2O_3$), 10.3 ml of a praseodymium nitrate solution (2.6 g in terms of $Pr_6O_{11}$), 2.5 g of colloidal silica (0.5 g in terms of $SiO_2$) were added, and the total volume was adjusted to 1 L with pure water.

Then the cerium suspension containing precursors of lanthanum oxide, praseodymium oxide, and silicon oxide was maintained at 120° C. for 2 hours, allowed to cool, and neutralized to pH 8.5 with aqueous ammonia.

A slurry resulting from the neutralization was subjected to solid-liquid separation by Nutsche filtering to obtain a filter cake, which was calcined at 500° C. for 10 hours in the atmosphere to obtain a composite oxide powder mainly composed of cerium oxide with 1 part by mass of silicon oxide with respect to 100 parts by mass in total of cerium oxide, lanthanum oxide, and praseodymium oxide contained at 90:5:5 by mass.

The obtained composite oxide powder was measured of the specific surface areas by the BET method after calcination at 900° C. for 5 hours and at 1000° C. for 5 hours, in the atmosphere. Further, the cerium oxide reducibility was calculated from the measurement of temperature-programmed reduction (TPR) from 50° C. to 900° C. after calcination at 1000° C. for 5 hours. The results are shown in Table 1.

Example 2

This example relates to a composite oxide containing cerium oxide, lanthanum oxide, and praseodymium oxide at 90:5:5 by mass in total of 100 parts by mass, with respect to which 2 parts by mass of silicon oxide was added.

A composite oxide powder mainly composed of cerium oxide and containing cerium oxide, lanthanum oxide, and praseodymium oxide at 90:5:5 by mass and 2 parts by mass of silicon oxide with respect 100 parts by mass in total of the cerium oxide, lanthanum oxide, and praseodymium oxide, was prepared in the same way as in Example 1 except that the amount of the colloidal silica was 4.9 g (1.0 g in terms of $SiO_2$). The properties of the composite oxide powder thus obtained were evaluated in the same way as in Example 1. The results are shown in Table 1.

Example 3

This example relates to a composite oxide containing cerium oxide, lanthanum oxide, and praseodymium oxide at 90:5:5 by mass in total of 100 parts by mass, with respect to which 5 parts by mass of silicon oxide was added.

A composite oxide powder mainly composed of cerium oxide and containing cerium oxide, lanthanum oxide, and praseodymium oxide at 90:5:5 by mass and 5 parts by mass of silicon oxide with respect to 100 parts by mass in total of the cerium oxide, lanthanum oxide, and praseodymium oxide, was prepared in the same way as in Example 1 except that the amount of the colloidal silica was 12.7 g (2.6 g in terms of $SiO_2$). The properties of the composite oxide powder thus obtained were evaluated in the same way as in Example 1. The results are shown in Table 1.

Example 4

This example relates to a composite oxide containing cerium oxide, lanthanum oxide, and praseodymium oxide at 90:5:5 by mass in total of 100 parts by mass, with respect to which 10 parts by mass of silicon oxide was added.

A composite oxide powder mainly composed of cerium oxide and containing cerium oxide, lanthanum oxide, and praseodymium oxide at 90:5:5 by mass and 10 parts by mass of silicon oxide with respect to 100 parts by mass in total of the cerium oxide, lanthanum oxide, and praseodymium oxide, was prepared in the same way as in Example 1 except that the amount of the colloidal silica was 25.4 g (5.2 g in terms of $SiO_2$). The properties of the composite oxide powder thus obtained were evaluated in the same way as in Example 1. The results are shown in Table 1.

Example 5

This example relates to a composite oxide containing cerium oxide, lanthanum oxide, and praseodymium oxide at 90:5:5 by mass in total of 100 parts by mass, with respect to which 20 parts by mass of silicon oxide was added.

A composite oxide powder mainly composed of cerium oxide and containing cerium oxide, lanthanum oxide, and praseodymium oxide at 90:5:5 by mass and 20 parts by mass of silicon oxide with respect to 100 parts by mass in total of the cerium oxide, lanthanum oxide, and praseodymium oxide, was prepared in the same way as in Example 1 except that the amount of the colloidal silica was 50.8 g (10.4 g in terms of $SiO_2$). The properties of the composite oxide powder thus obtained were evaluated in the same way as in Example 1. The results are shown in Table 1.

Example 6

This example relates to a composite oxide containing cerium oxide, lanthanum oxide, and praseodymium oxide at 90:5:5 by mass in total of 100 parts by mass, with respect to which 2 parts by mass of silicon oxide was added, and prepared by a method different from Example 2.

50 g of a ceric nitrate solution in terms of $CeO_2$ containing not less than 90 mol % tetravalent cerium ions was measured out, and adjusted to a total amount of 1 L with pure water. The obtained solution was heated to 100° C., maintained at this temperature for 30 minutes, and allowed to cool down to the room temperature, to thereby obtain a cerium suspension.

After the mother liquor was removed from the cerium suspension thus obtained, 10.4 ml of a lanthanum nitrate solution (2.6 g in terms of $La_2O_3$) and 10.3 ml of a praseodymium nitrate solution (2.6 g in terms of $Pr_6O_{11}$) were added, and the total volume was adjusted to 1 L with pure water.

Then the cerium suspension containing precursors of lanthanum oxide and praseodymium oxide was maintained at 120° C. for 2 hours, allowed to cool, and neutralized to pH 8.5 with aqueous ammonia.

A slurry resulting from the neutralization was subjected to solid-liquid separation by Nutsche filtering to obtain a filter cake, which was calcined at 300° C. for 10 hours in the atmosphere to obtain a rare earth composite oxide mainly composed of cerium oxide with 5% by mass each of lanthanum oxide and praseodymium oxide.

Then 16.1 g of the rare earth composite oxide thus obtained was placed in a beaker, to which an ethanol solution of 1.04 g tetraethyl orthosilicate (0.30 g in terms of $SiO_2$) in a total amount of 9 ml was added to impregnate the rare earth composite oxide with a solution of a silicon oxide precursor by pore-filling.

The rare earth composite oxide impregnated with the solution of a silicon oxide precursor was dried at 120° C. for 10 hours, and calcined at 500° C. for 10 hours in the atmosphere to obtain a composite oxide powder mainly composed of cerium oxide and containing cerium oxide, lanthanum oxide, and praseodymium oxide at 90:5:5 by mass and 2 parts by mass of silicon oxide with respect to 100 parts by mass in total of the cerium oxide, lanthanum oxide, and praseodymium oxide. The properties of the composite oxide powder thus obtained were evaluated in the same way as in Example 1. The results are shown in Table 1.

Example 7

This example relates to a composite oxide containing cerium oxide, lanthanum oxide, and praseodymium oxide at 90:5:5 by mass in total of 100 parts by mass, with respect to which 5 parts by mass of silicon oxide was added.

A composite oxide powder mainly composed of cerium oxide and containing cerium oxide, lanthanum oxide, and praseodymium oxide at 90:5:5 by mass and 5 parts by mass of silicon oxide with respect to 100 parts by mass in total of the cerium oxide, lanthanum oxide, and praseodymium oxide, was prepared in the same way as in Example 6 except that the amount of the tetraethyl orthosilicate was 2.60 g (0.75 g in terms of $SiO_2$). The properties of the composite oxide powder thus obtained were evaluated in the same way as in Example 1. The results are shown in Table 1.

Example 8

This example relates to a composite oxide containing cerium oxide, lanthanum oxide, and praseodymium oxide at 90:5:5 by mass in total of 100 parts by mass, with respect to which 10 parts by mass of silicon oxide was added.

A composite oxide powder mainly composed of cerium oxide and containing cerium oxide, lanthanum oxide, and praseodymium oxide at 90:5:5 by mass and 10 parts by mass of silicon oxide with respect to 100 parts by mass in total of the cerium oxide, lanthanum oxide, and praseodymium oxide, was prepared in the same way as in Example 6 except that the amount of the tetraethyl orthosilicate was 5.20 g (1.5 g in terms of $SiO_2$). The properties of the composite oxide powder thus obtained were evaluated in the same way as in Example 1. The results are shown in Table 1.

Example 9

This example relates to a composite oxide containing cerium oxide, lanthanum oxide, and praseodymium oxide at 90:5:5 by mass in total of 100 parts by mass, with respect to which 20 parts by mass of silicon oxide was added.

A composite oxide powder mainly composed of cerium oxide and containing cerium oxide, lanthanum oxide, and praseodymium oxide at 90:5:5 by mass and 20 parts by mass of silicon oxide with respect to 100 parts by mass in total of the cerium oxide, lanthanum oxide, and praseodymium oxide, was prepared in the same way as in Example 6 except that the amount of the tetraethyl orthosilicate was 10.4 g (3.0 g in terms of $SiO_2$). The properties of the composite oxide powder thus obtained were evaluated in the same way as in Example 1. The results are shown in Table 1.

Example 10

This example relates to a composite oxide containing cerium oxide and lanthanum oxide at 90:10 by mass in total of 100 parts by mass, with respect to which 5 parts by mass of silicon oxide was added.

A composite oxide powder mainly composed of cerium oxide and containing cerium oxide and lanthanum oxide at 90:10 by mass and 5 parts by mass of silicon oxide with respect to 100 parts by mass in total of the cerium oxide and lanthanum oxide, was prepared in the same way as in Example 6 except that instead of adding the lanthanum nitrate solution and the praseodymium nitrate solution, only 20.8 ml of the lanthanum nitrate solution (5.2 g in terms of $La_2O_3$) was added, and the amount of tetraethyl orthosilicate was 2.60 g (0.75 g in terms of $SiO_2$). The properties of the composite oxide powder thus obtained were evaluated in the same way as in Example 1. The results are shown in Table 1.

Example 11

This example relates to a composite oxide containing cerium oxide and lanthanum oxide at 85:15 by mass in total of 100 parts by mass, with respect to which 5 parts by mass of silicon oxide was added.

A composite oxide powder mainly composed of cerium oxide and containing cerium oxide and lanthanum oxide at 85:15 by mass and 5 parts by mass of silicon oxide with respect to 100 parts by mass in total of the cerium oxide and lanthanum oxide, was prepared in the same way as in Example 10 except that instead of adding the lanthanum nitrate solution and the praseodymium nitrate solution, only 33.1 ml of the lanthanum nitrate solution (8.3 g in terms of $La_2O_3$) was added. The properties of the composite oxide powder thus obtained were evaluated in the same way as in Example 1. The results are shown in Table 1.

Example 12

This example relates to a composite oxide containing cerium oxide and praseodymium oxide at 90:10 by mass in total of 100 parts by mass, with respect to which 5 parts by mass of silicon oxide was added.

A composite oxide powder mainly composed of cerium oxide and containing cerium oxide and praseodymium oxide at 90:10 by mass and 5 parts by mass of silicon oxide with respect to 100 parts by mass in total of the cerium oxide and praseodymium oxide, was prepared in the same way as in Example 6 except that instead of adding the lanthanum nitrate solution and the praseodymium nitrate solution, only 20.5 ml of the praseodymium nitrate solution (5.2 g in terms of $Pr_6O_{11}$) was added, and the amount of tetraethyl orthosilicate was 2.60 g (0.75 g in terms of $SiO_2$). The properties of the composite oxide powder thus obtained were evaluated in the same way as in Example 1. The results are shown in Table 1.

Example 13

This example relates to a composite oxide containing cerium oxide and neodymium oxide at 90:10 by mass in total of 100 parts by mass, with respect to which 5 parts by mass of silicon oxide was added.

A composite oxide powder mainly composed of cerium oxide and containing cerium oxide and neodymium oxide at 90:10 by mass and 5 parts by mass of silicon oxide with respect to 100 parts by mass in total of the cerium oxide and neodymium oxide, was prepared in the same way as in Example 6 except that instead of adding the lanthanum nitrate solution and the praseodymium nitrate solution, 23.5 ml of a neodymium nitrate solution (5.2 g in terms of $Nd_2O_3$) was added, and the amount of tetraethyl orthosilicate was 2.60 g (0.75 g in terms of $SiO_2$). The properties of the composite oxide powder thus obtained were evaluated in the same way as in Example 1. The results are shown in Table 1.

Example 14

This example relates to a composite oxide containing cerium oxide and yttrium oxide at 90:10 by mass in total of 100 parts by mass, with respect to which 5 parts by mass of silicon oxide was added.

A composite oxide powder mainly composed of cerium oxide and containing cerium oxide and yttrium oxide at 90:10 by mass and 5 parts by mass of silicon oxide with respect to 100 parts by mass in total of the cerium oxide and yttrium oxide, was prepared in the same way as in Example 6 except that instead of adding the lanthanum nitrate solution and the praseodymium nitrate solution, 22.9 ml of a yttrium nitrate solution (5.2 g in terms of $Y_2O_3$) was added, and the amount of tetraethyl orthosilicate was 2.60 g (0.75 g in terms of $SiO_2$). The properties of the composite oxide powder thus obtained were evaluated in the same way as in Example 1. The results are shown in Table 1.

Comparative Examples 1 to 4

These examples relate to composite oxides without silicon oxide, which were obtained before the impregnation with the solution of a silicon oxide precursor in Examples 10, 11, 12, and 6, respectively. The properties of the obtained oxide powders were evaluated in the same way as in Example 1. The results are shown in Table 1.

What is claimed is:

1. A composite oxide consisting of
   (a) cerium;
   (b) at least one of rare earth metal elements other than cerium, at a mass ratio of 85:15 to 99:1 in terms oxides; and
   (c) silicon at more than 0 parts by mass and not more than 20 parts by mass in terms of $SiO_2$ with respect to 100 parts by mass of a total of said cerium (a) and said at least one of rare earth metal elements other than cerium (b),
   wherein said composite oxide has properties of exhibiting a specific surface area of not less than 40 $m^2/g$ as measured by BET method after calcination at 900° C. for 5 hours, and a reducibility of not lower than 30% as calculated from measurement of temperature-programmed reduction from 50° C. to 900° C. after calcination at 1000° C. for 5 hours.

2. The composite oxide according to claim 1 having a property of exhibiting a specific surface area of not less than 60 $m^2/g$ as measured by BET method after calcination at 900° C. for 5 hours.

3. The composite oxide according to claim 1 having a property of exhibiting a specific surface area of not less than 25 $m^2/g$ as measured by BET method after calcination at 1000° C. for 5 hours.

4. The composite oxide according to claim 1 having a property of exhibiting a reducibility of not lower than 40% as calculated from measurement of temperature-programmed reduction from 50° C. to 900° C. after calcination at 1000° C. for 5 hours.

5. The composite oxide according to claim 1, wherein a content of silicon (c) is 5 to 20 parts by mass in terms of $SiO_2$ with respect to 100 parts by mass in total of said cerium (a) and said at least one of rare earth metal elements other than cerium (b) in terms of oxides.

6. A method for producing a composite oxide of claim 1 comprising the steps of:
   (a) providing a cerium solution not less than 90 mol % of which cerium ions are tetravalent,

TABLE 1

|  | Composition of Ce + RE in terms of oxides (mass %) | Si content in terms of $SiO_2$ with respect to 100 parts by mass in total of oxides of Ce + RE (parts by mass) | Specific surface area ($m^2/g$) 900° C./5 h | Specific surface area ($m^2/g$) 1000° C./5 h | Reducibility (%) 1000° C./5 h |
|---|---|---|---|---|---|
| Example 1 | Ce/La/Pr = 90/5/5 | 1 | 41 | 26 | 33 |
| Example 2 | Ce/La/Pr = 90/5/5 | 2 | 53 | 33 | 41 |
| Example 3 | Ce/La/Pr = 90/5/5 | 5 | 83 | 55 | 51 |
| Example 4 | Ce/La/Pr = 90/5/5 | 10 | 101 | 70 | 61 |
| Example 5 | Ce/La/Pr = 90/5/5 | 20 | 108 | 68 | 82 |
| Example 6 | Ce/La/Pr = 90/5/5 | 2 | 52 | 33 | 36 |
| Example 7 | Ce/La/Pr = 90/5/5 | 5 | 83 | 55 | 43 |
| Example 8 | Ce/La/Pr = 90/5/5 | 10 | 103 | 74 | 66 |
| Example 9 | Ce/La/Pr = 90/5/5 | 20 | 105 | 70 | 76 |
| Example 10 | Ce/La = 90/10 | 5 | 80 | 55 | 49 |
| Example 11 | Ce/La = 85/15 | 5 | 63 | 41 | 42 |
| Example 12 | Ce/Pr = 90/10 | 5 | 80 | 56 | 51 |
| Example 13 | Ce/Nd = 90/10 | 5 | 68 | 49 | 43 |
| Example 14 | Ce/Y = 90/10 | 5 | 64 | 45 | 42 |
| Comp. Ex. 1 | Ce/La = 90/10 | 0 | 33 | 22 | 27 |
| Comp. Ex. 2 | Ce/La = 85/15 | 0 | 31 | 21 | 26 |
| Comp. Ex. 3 | Ce/Pr = 90/10 | 0 | 32 | 19 | 35 |
| Comp. Ex. 4 | Ce/La/Pr = 90/5/5 | 0 | 34 | 21 | 26 |

RE stands for rare earth metal elements other than cerium and including yttrium.

(b) heating and maintaining said cerium solution obtained from step (a) up to and at not lower than 60° C.,
(c) adding an oxide precursor of at least one of rare earth metal elements other than cerium, to a cerium suspension obtained through said heating and maintaining,
(d) heating and maintaining said cerium suspension containing said oxide precursor of at least one of rare earth metal elements other than cerium up to and at not lower than 100° C.,
(e) adding a precipitant to the suspension obtained from step (d) to obtain a precipitate,
(f) calcining said precipitate,
(g) impregnating an oxide obtained through said calcining, with a solution of a silicon oxide precursor, and
(h) calcining said oxide impregnated with the solution of a silicon oxide precursor.

7. A method for producing a composite oxide of claim 1 comprising the steps of:
(A) providing a cerium solution not less than 90 mol % of which cerium ions are tetravalent,
(B) heating and maintaining said cerium solution obtained from step (A) up to and at not lower than 60° C.,
(C) adding a silicon oxide precursor and an oxide precursor of at least one of rare earth metal elements other than cerium, to a cerium suspension obtained through said heating and maintaining,
(D) heating and maintaining said cerium suspension containing said silicon oxide precursor and said oxide precursor of at least one of rare earth metal elements other than cerium, up to and at not less than 100° C.,
(E) adding a precipitant to the suspension obtained from step (D) to obtain a precipitate, and
(F) calcining said precipitate thus obtained.

8. The method according to claim 6 wherein a cerium content of said cerium solution in step (a) or (A) is 5 to 100 g/L in terms of $CeO_2$.

9. A catalyst for exhaust gas purification comprising the composite oxide according to claim 1.

* * * * *